(12) United States Patent
Watanabe et al.

(10) Patent No.: US 7,011,604 B2
(45) Date of Patent: Mar. 14, 2006

(54) FUEL INJECTION CONTROL SYSTEM FOR INTERNAL COMBUSTION ENGINE

(75) Inventors: Tsuguo Watanabe, Saitama (JP); Masahiko Abe, Saitama (JP); Tatsuo Hayashi, Saitama (JP); Tomomi Yuhara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/645,612

(22) Filed: Aug. 22, 2003

(65) Prior Publication Data

US 2004/0077460 A1 Apr. 22, 2004

(30) Foreign Application Priority Data

Sep. 10, 2002 (JP) ............................. 2002-264176

(51) Int. Cl.
 *B60K 41/04* (2006.01)
(52) U.S. Cl. .................. 477/110; 477/107; 701/54; 701/61
(58) Field of Classification Search ............... 477/107, 477/110; 123/332, 349; 701/54, 61
See application file for complete search history.

(56) References Cited

U.S. PATENT DOCUMENTS

| 3,763,720 | A | | 10/1973 | Aono et al. | |
|---|---|---|---|---|---|
| 4,976,239 | A | * | 12/1990 | Hosaka | 123/399 |
| 5,019,799 | A | * | 5/1991 | Oshiage et al. | 340/438 |
| 5,230,318 | A | * | 7/1993 | Iwamoto | 123/478 |
| 6,240,534 | B1 | * | 5/2001 | Nakane | 714/55 |
| 6,269,289 | B1 | * | 7/2001 | Toukura et al. | 701/1 |
| 6,301,529 | B1 | * | 10/2001 | Itoyama et al. | 701/22 |
| 6,442,471 | B1 | | 8/2002 | Bosse | |
| 2002/0010539 | A1 | * | 1/2002 | Machida et al. | 701/104 |
| 2002/0107107 | A1 | | 8/2002 | Ogawa et al. | |

FOREIGN PATENT DOCUMENTS

| DE | 100 14 218 A1 | | 10/2001 |
|---|---|---|---|
| JP | 2000-18063 | * | 1/2000 |

* cited by examiner

*Primary Examiner*—Ha Ho
(74) *Attorney, Agent, or Firm*—Birch, Stewart, Kolasch & Birch, LLP

(57) ABSTRACT

A fuel injection control system for an internal combustion engine can obtain an optimum fuel injection quantity in response to a traveling load without the need for a large memory. The gear position discrimination unit determines the present gear position Ngp on the basis of the vehicle speed Vpls and the engine speed NE. The Kgpd calculation unit calculates the correction factor by gear Kgpd on the basis of the gear position Ngp and the engine speed NE. The state judgment unit judges whether the engine is in a steady state or in a transient state. The map selection unit selects, on the basis of the judgment result of the engine state, the PB map or the TH map for determining the basic injection quantity Ti. The basic injection quantity determination unit determines the basic injection quantity Ti on the basis of a product of the PB map or TH map and the correction factor by gear Kgpd.

10 Claims, 6 Drawing Sheets

FUEL INJECTION CONTROL SYSTEM FOR INTERNAL COMBUSTION ENGINE

CROSS-REFERENCE TO RELATED APPLICATIONS

This nonprovisional application claims priority under 35 U.S.C. § 119(a) on Patent Application No. 2002-264176, filed in Japan on Sep. 10, 2002, the entirety of which is incorporated herein by reference.

BACKGROUND OF THE INVENTION

1. Field of the Invention

The present invention relates to a fuel injection control system for an internal combustion engine. More particularly, the present invention relates to a fuel injection control system for correcting a fuel injection quantity on the basis of a gear position.

2. Description of Background Art

A basic injection quantity of fuel is preferably determined on the basis of an intake air quantity. A technique has been disclosed in which manifold air pressure capable of accurately representing the intake air quantity has been adopted as a parameter for determining the basic injection quantity. On the other hand, in a motorcycle, the response to opening a throttle valve is an important aspect of operating performance and marketability as a whole. However, a manifold air pressure sensor does not provide an excellent output response to a change in negative pressure during transient driving, such as when the throttle is suddenly opened. Accordingly, it becomes difficult to accurately represent the intake air quantity.

In order to solve such a technical problem, for example, Japanese Patent Laid-Open No. 4-365943 discloses a technique in which a throttle opening θTH is newly added as a parameter for determining the basic injection quantity of fuel. The basic injection quantity is retrieved in a steady state from a manifold air pressure map (PB map) in which the engine speed NE and the manifold air pressure PB are used as parameters. In a transient state, the basic injection quantity is retrieved from a throttle opening map (TH map) in which the engine speed NE and the throttle opening θTH are used as parameters.

According to the background art technique described above, when an attempt is made to determine the basic injection quantity on the basis of the TH map, the basic injection quantity will be uniquely determined if the engine speed NE and the throttle opening θTH are obtained. However, when the gear position is low (speed reducing ratio is large) even if the engine speed NE and the throttle opening θTH are the same, running resistance (engine load) becomes lower than at a high gear position (speed reducing ratio is small). Therefore, it is preferable to differentiate the basic injection quantity in accordance with the gear position. However, if an attempt is made to provide the TH map for each gear position, there has been a technical problem in that numerous memory areas become necessary.

SUMMARY OF THE INVENTION

It is an object of the present invention to solve the problem of the background art technique described above, and to provide a fuel injection control system for an internal combustion engine capable of determining an optimum fuel injection quantity in response to a running load without the necessity of providing a plurality of throttle opening maps.

In order to achieve the above-described object, the present invention includes the following means that have been employed in a fuel injection control system for an internal combustion engine for transmitting a driving force to an output shaft through a transmission.

(1). The fuel injection control system includes: means for detecting the engine speed NE; means for determining the fuel injection quantity as a function of the engine speed NE; means for discriminating the gear position of the transmission; and means for correcting the fuel injection quantity on the basis of the discrimination result of the gear position.

(2). The correction means includes means for determining the correction factor as a function of the gear position, and means for multiplying the fuel injection quantity by the correction factor.

According to the above-described feature (1), since the fuel injection quantity is corrected in response to the gear position even if the engine speed NE and the throttle opening θTH are the same, it becomes possible to always perform optimum fuel injection.

According to the above-described feature (2), it is possible to obtain the optimum fuel injection quantity for each gear position without providing a TH map for each gear position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
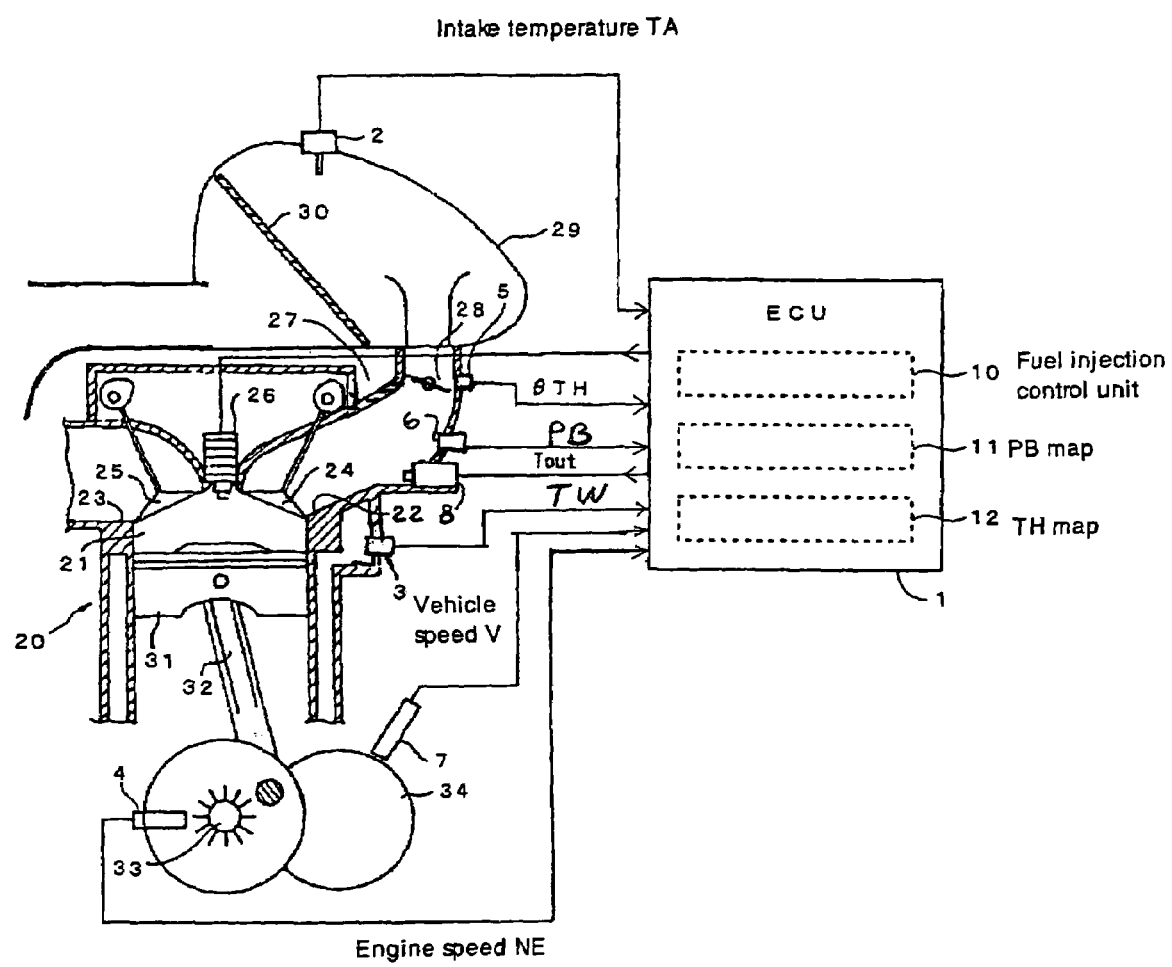
FIG. 1 is a general block diagram showing a fuel injection system according to an embodiment of the present invention.

Hereinafter, with reference to the accompanying drawings, a description will be made of a preferred embodiment of the present invention in detail. FIG. 1 is a general block diagram showing a fuel injection control system according to one embodiment of the present invention. An intake port 22 and an exhaust port 23 are opened into a combustion chamber 21 of the engine 20. Each port 22 and 23 is provided with an intake valve 24 and an exhaust valve 25, respectively. An ignition plug 26 is provided extending into the combustion chamber 21.

A throttle valve 28 for adjusting the intake air quantity in response to the opening θTH thereof, and a throttle sensor 5 for detecting the throttle opening are provided in an intake passage 27 leading to the intake port 22. A vacuum sensor 6 for detecting the manifold air pressure PB and a fuel injection valve 8 are arranged on the downstream side of the throttle valve 28. An air cleaner 29 is provided at a terminal of the intake passage 27. An air filter 30 and an intake temperature sensor 2 for detecting the intake (atmospheric) temperature TA are provided within the air cleaner 29. Open air is taken into the intake passage 27 through the air filter 30.

An engine speed sensor 4 for detecting engine speed NE on the basis of a rotation angle of a crankshaft 33 is arranged opposite to the crankshaft 33, which is coupled to a piston 31 of the engine 20 through a connecting rod 32. Furthermore, a vehicle speed sensor 7 for detecting vehicle speed Vpls is arranged opposite to a rotor 34, such as a gear, which is coupled to the crankshaft 33 for rotation. A water temperature sensor 3 for detecting cooling water temperature TW representing the engine temperature is provided on a water jacket formed around the engine 20.

The ECU (Engine Control Unit) 1 includes a fuel injection control unit 10, a PB map 11, and a TH map 12. In the PB map 11, a basic injection quantity Ti of fuel has been registered for each corresponding relationship between the engine speed NE and the manifold air pressure PB. In the TH map 12, a basic injection quantity Ti of fuel has been registered for each corresponding relationship between the engine speed NE and the throttle opening θTH.

The fuel injection control unit 10 outputs an injection signal Tout to the fuel injection valve 8 on the basis of a signal (process value) obtained by each of the sensors, and the PB map 11 or the TH map 12. This injection signal Tout is a pulse signal having a pulse width responsive to the injection quantity. The fuel injection valve 8 is opened by a time period corresponding to the pulse width to inject the fuel.

Figure 2:
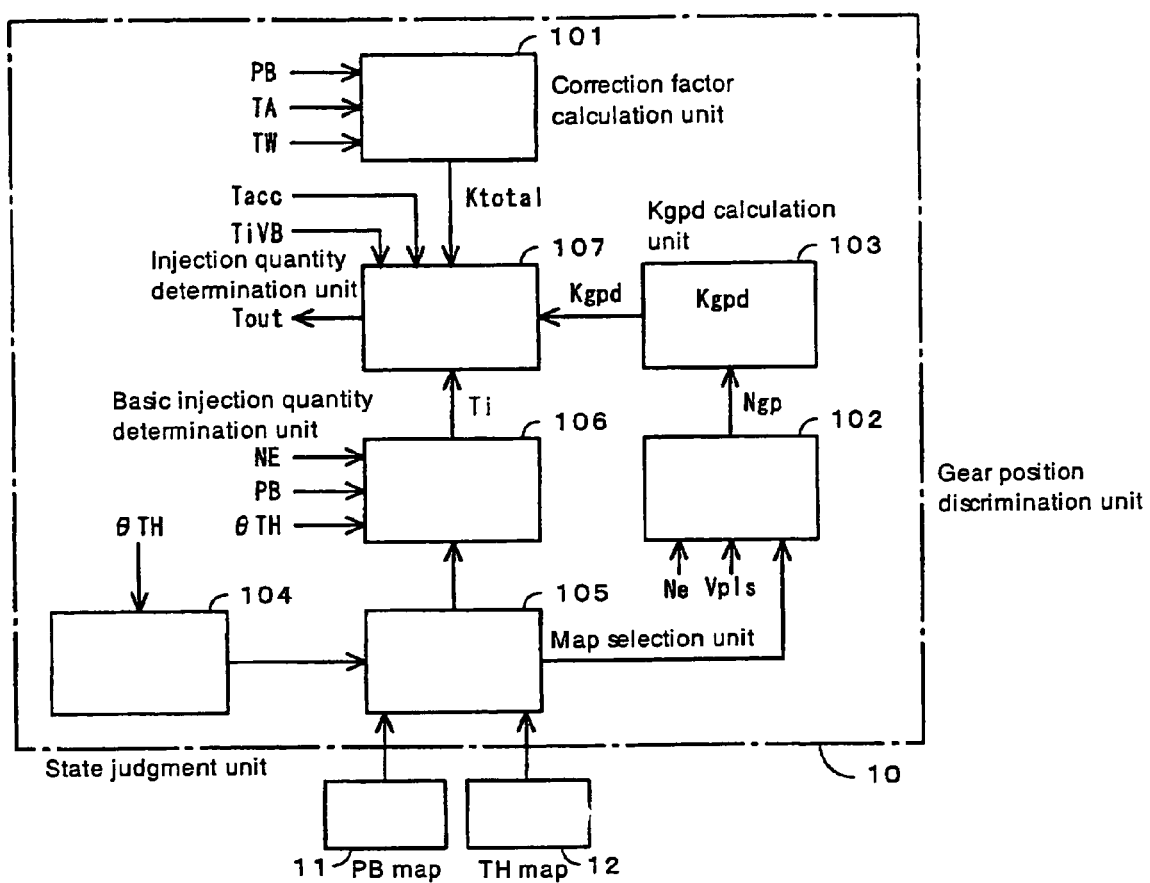
FIG. 2 is a functional block diagram showing a fuel injection control unit 10 of FIG. 1.

FIG. 2 is a functional block diagram for the fuel injection control unit 10. It should be noted that the same reference numerals have been used to identify the same or similar elements.

A correction factor calculation unit 101 calculates a manifold air pressure correction factor Kpb, an intake temperature correction factor Kta and a cooling water temperature correction factor Ktw and the like on the basis of process values such as the manifold air pressure PB, the intake temperature TA and the cooling water temperature TW. The correction factor calculation unit 101 then integrates all of the correction factors to calculate a total correction factor Ktotal.

A state judgment unit 104 judges whether the engine is in a steady state or in a transient state on the basis of an hour rate of change ΔθTH of the throttle opening θTH. A map selection unit 105 selects the PB map 11 or the TH map 12 as a data map for determining the basic injection quantity Ti of fuel on the basis of the judgment results of the engine state. When the TH map 12 is selected by the map selection unit 105, a gear position judgment unit 102 judges a present gear position Ngp on the basis of the vehicle speed Vpls and the engine speed NE.

A Kgpd calculation unit 103 calculates a correction factor by a gear Kgpd on the basis of the discrimination result of the gear position Ngp and the engine speed NE. A basic injection quantity determination unit 106 determines the basic injection quantity Ti on the basis of the engine speed NE, the manifold air pressure PB and the PB map 11, or on the basis of the engine speed NE, the throttle opening θTH and the TH map 12. An injection quantity determination unit 107 determines the fuel injection quantity Tout on the basis of the basic injection quantity Ti, the total correction factor Ktotal, the correction factor by a gear Kgpd and an accelerated correction value Tacc and the like.

Referring to the flowchart of FIG. 3, a description will be made of the operation of the fuel injection control unit 10 in detail. This handling is executed by interruption due to a crank pulse in a predetermined stage.

In a step S1, the engine speed NE is read. In a step S2, the throttle opening θTH is read. In a step S3, an hour rate of change ΔθTH of the throttle opening θTH is calculated on the basis of a differential between a previous value for the throttle opening θTH obtained by detecting in the step S2 and this value. In a step S4, the manifold air pressure PB is read. In a step S5, the hour rate of change ΔθTH of the throttle opening θTH is compared with the basic rate of change ΔθThref in the state judgment unit 104.

If the rate of change ΔθTH is under the basic rate of change ΔθTHref, the sequence will proceed to a step S11 by judging that the throttle handling is slow and the engine is in a steady state. In the step S11, the PB map 11 is selected by the map selection unit 105. In a step S12, the PB map 11 is retrieved on the basis of the engine speed NE and the manifold air pressure PB to determine the basis injection quantity Ti. In a step S13, the final fuel injection quantity Tout is calculated by adding a further predetermined acceleration correction quantity Tacc and invalid injection time TiVB, to a product of the basic injection quantity Ti and the total correction factor Ktotal obtained by the correction factor calculation unit 101.

The acceleration correction quantity Tacc is calculated in response to, for example, the rate of change of the throttle opening. The invalid injection time TiVB is a time period, of the intake-valve opening time period, which is not accompanied by perfect injection of fuel. The invalid injection time TiVB is determined by a type and structure of the fuel injection valve 8.

On the other hand, if the rate of change ΔθTH exceeds the basic rate of change ΔθTHref, the sequence will proceed to the step S6 by judging the engine to be in a transient state. In the step S6, the TH map 12 is selected by the map selection unit 105. In the step S7, the TH map 12 is retrieved on the basis of the engine speed NE and the throttle opening θTH to determine the basic injection quantity Ti. In the step S8, "Gear discrimination" is executed in the gear position discrimination unit 102. Gear discrimination occurs when the present gear position Ngp is discriminated on the basis of the engine speed NE and the vehicle speed Vpls.

Figure 4:
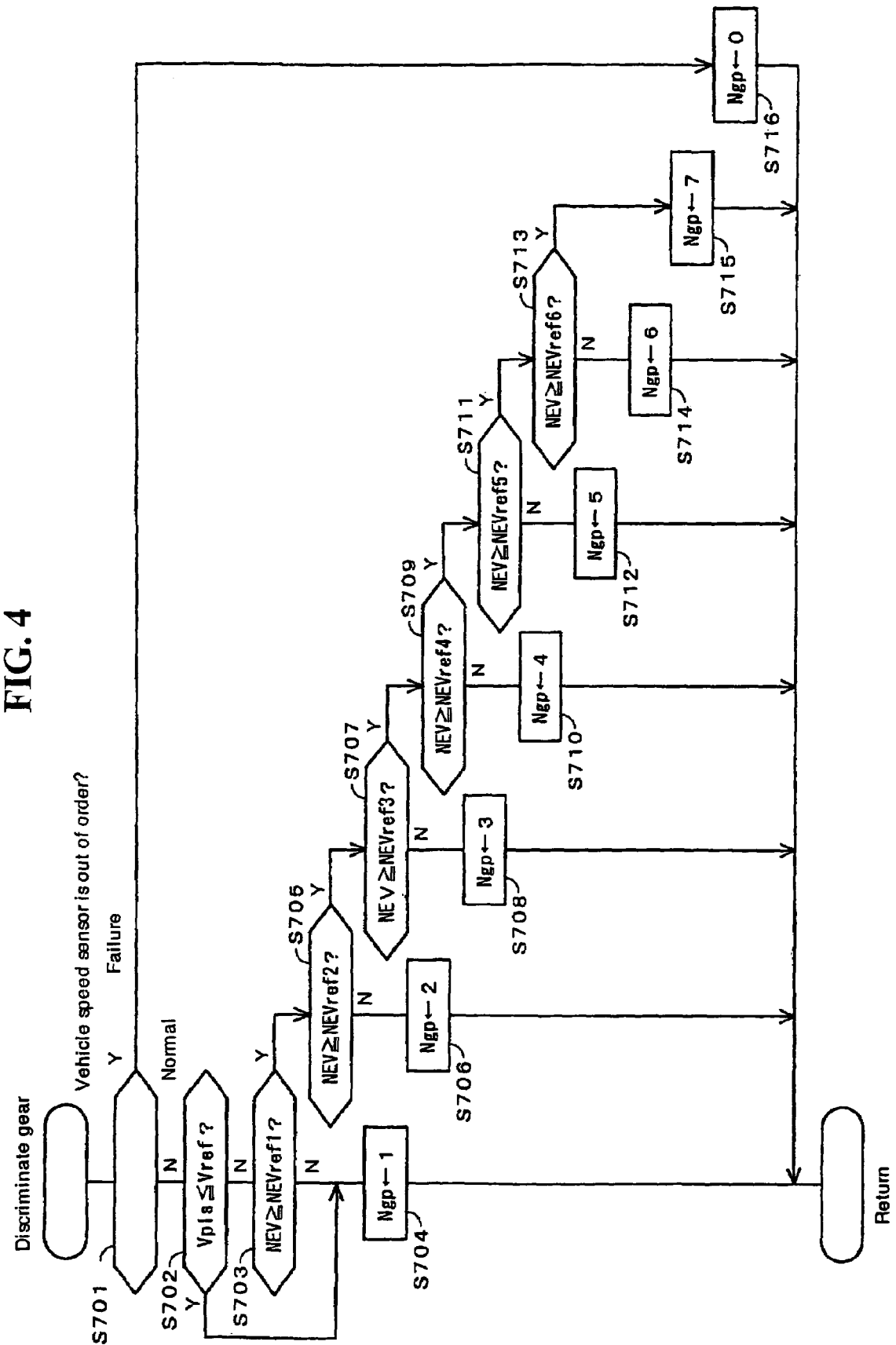
FIG. 4 is a flowchart showing a discrimination procedure of a gear position.

FIG. 4 is a flowchart showing a procedure of the above-described "Gear discrimination." In a step S701, it is judged whether or not this vehicle speed sensor 7 is normally operating on the basis of an output signal from a vehicle speed sensor 7. If out of order, the sequence will proceed to a step S716 and "0" is set in a gear position (GP) counter Ngp. If it is normally operating, the sequence will proceed to a step S702 to compare the vehicle speed Vpls with the reference vehicle speed Vref. This reference vehicle speed Vref is a reference value for judging whether or not the vehicle is traveling at low speed, and has been set to, for example, several km/h.

If the vehicle speed Vpls exceeds the reference vehicle speed Vref, the sequence will proceed to a step S703 to compare a gear ratio NEV (=NE/Vpls) with a first reference gear ratio NEVref1. If the gear ratio NEV is smaller than the first reference gear ratio NEVref1, "1" is set in the GP counter Ngp in a step S704, indicating that the transmission is at the first stage. In this respect, in the step S702, even when the vehicle speed Vpls is judged to be lower than the reference vehicle speed Vref, "1" is set to the GP counter Ngp in the step S704.

On the other hand, if it is judged in the step S703 that the gear ratio NEV exceeds the first reference gear ratio Vref1, the sequence will proceed to a step S705, in which the gear ratio NEV will be compared with a second reference gear ratio NEVref2. If the gear ratio NEV is smaller than the second reference gear ratio NEVref2, "2" will be set to the GP counter Ngp in a step S706.

Similarly, if it is judged in the step S705 that the gear ratio NEV exceeds the second reference gear ratio NEVref2, the sequence will proceed to a step S707, in which the gear ratio NEV will be compared with a third reference gear ratio NEVref. If the gear ratio NEV is smaller than the third reference gear ratio NEVref, "3" will be set to the GP counter Ngp in a step S708.

Hereinafter, similarly, if it is judged in the step S709 that the gear ratio NEV is lower than the fourth reference gear ratio NEVref4, "4" will be set to the GP counter Ngp in a step S710. If it is judged in the step S711 that the gear ratio NEV is lower than the fifth reference gear ratio NEVref5, "5" will be set to the GP counter Ngp in a step S712. If it is judged in the step S713 that the gear ratio NEV is lower than the sixth reference gear ratio NEVref6, "6" will be set to the GP counter Ngp in a step S714, and if it is judged in the step S713 that the gear ratio NEV exceeds the sixth reference gear ratio NEVref6, "7" will be set to the GP counter Ngp in a step S715.

Figure 3:
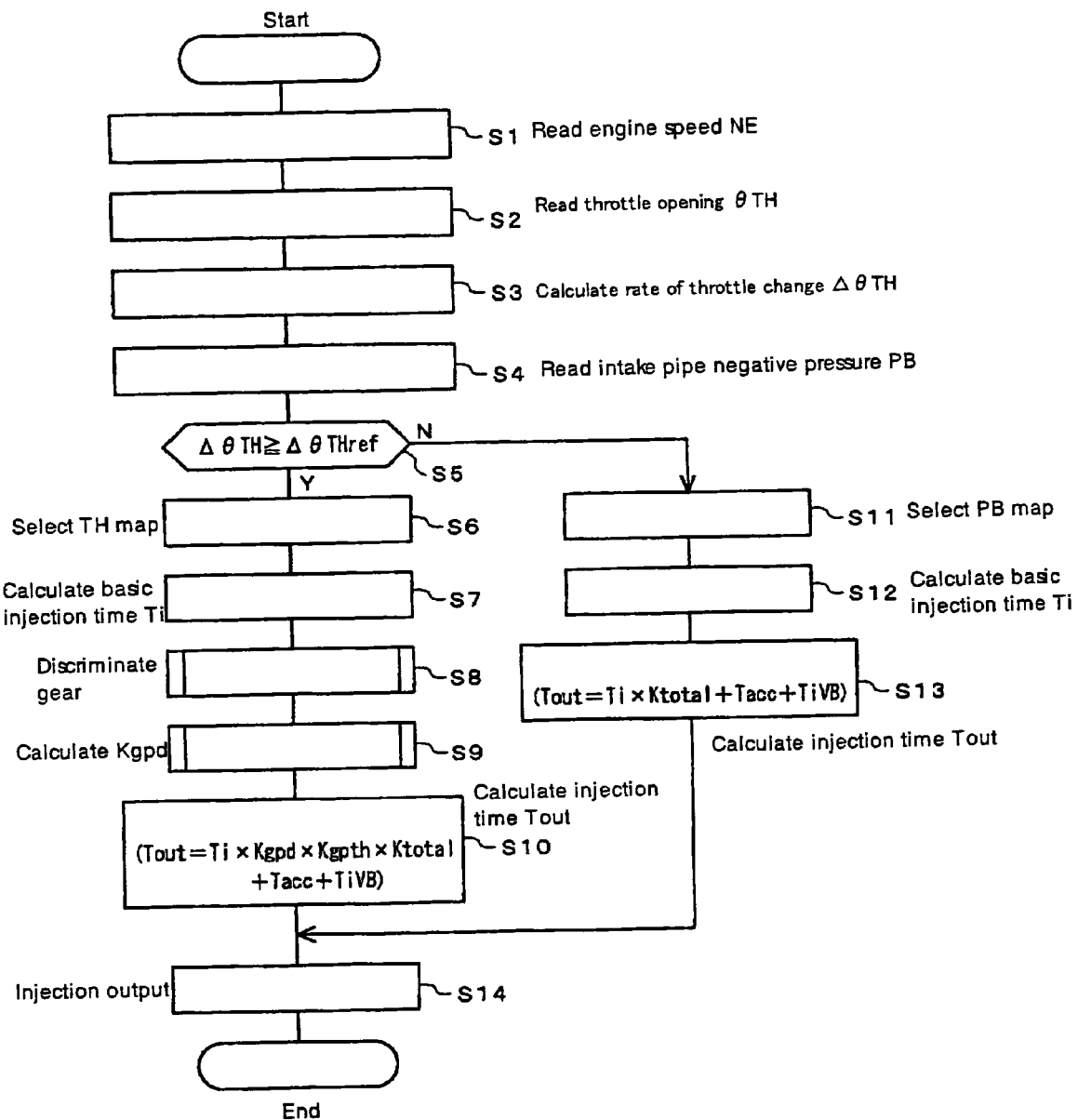
FIG. 3 is a flowchart showing a control procedure of fuel injection.

When registration of the gear position to the GP counter Ngp is completed as described above, "Kgpd calculation" for calculating the correction factor by a gear Kgpd is executed in the Kgpd calculation unit 103 on the basis of the registered value of this GP counter Ngp in a step S9 of FIG. 3.

Figure 5:
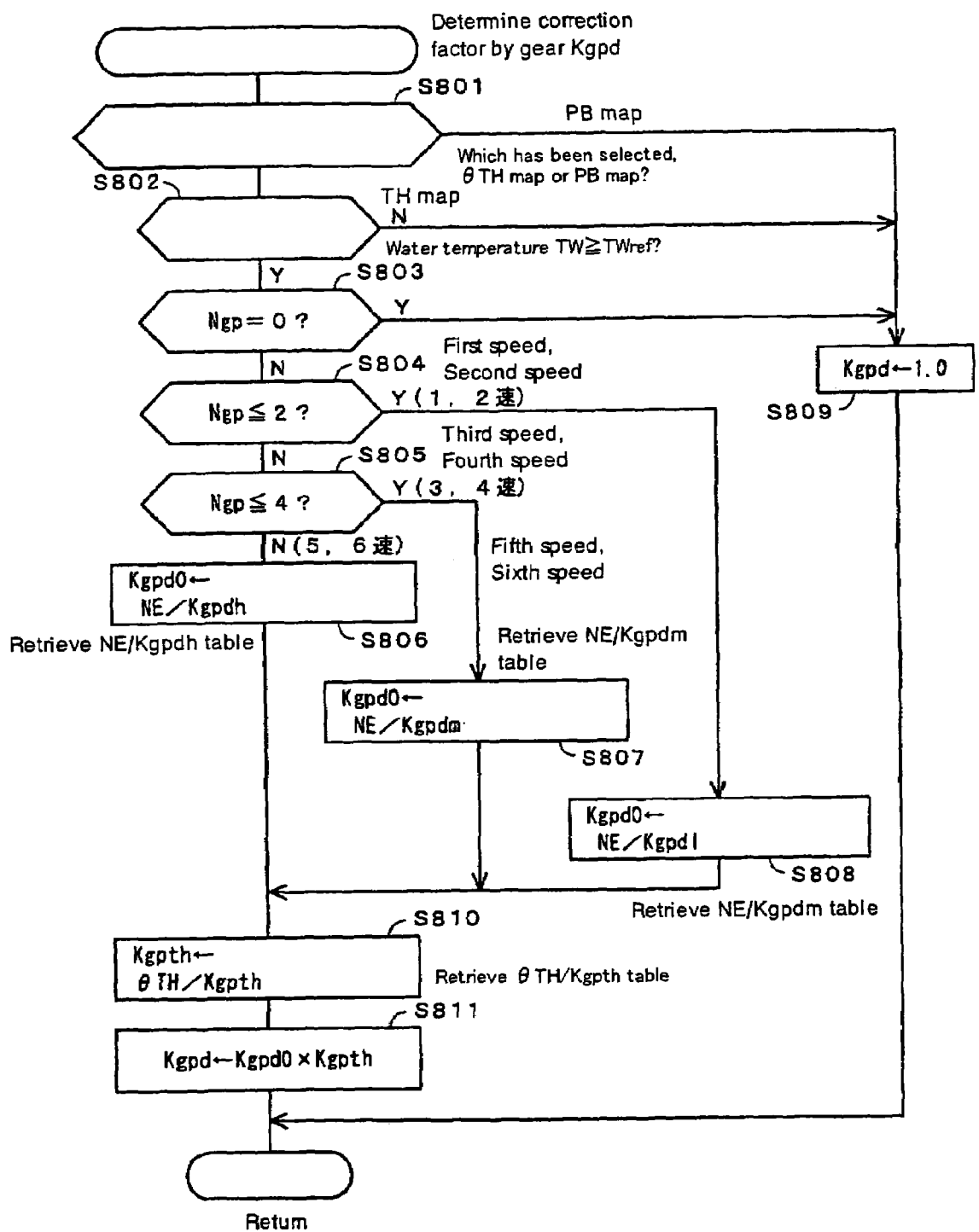
FIG. 5 is a flowchart showing a calculation procedure of a correction factor by a gear.

FIG. 5 is a flowchart showing the procedure of the above-described "Kgpd calculation." In a step S801, it is judged which map has been selected in the map selection unit 105. If the TH map 12 has been selected, the sequence will proceed to a step S802 to compare the cooling water temperature TW with the reference temperature Twref. If the cooling water temperature TW exceeds the reference temperature Twref, the above-described GP counter Ngp will be referred to in steps S803, S804 and S805.

If the GP counter Ngp indicates "5" or "6," an NE/Kgpdh table for during low load to be described later will be retrieved on the basis of the engine speed NE in a step S806. The retrieval result will be registered as a provisional value Kgpd0 of Kgpd. Similarly, if the GP counter Ngp indicates "3" or "4," an NE/kgpdm table for during middle load to be described later will be retrieved on the basis of the engine speed NE in a step S807. The retrieval result will be registered as the provisional value Kgpd0. Similarly, if the GP counter Ngp indicates "1" or "2," an NE/Kgpdl table for during high load to be described later will be retrieved on the basis of the engine speed NE in a step S808. The retrieval result will be registered as the provisional value Kgpd0.

Figure 6:
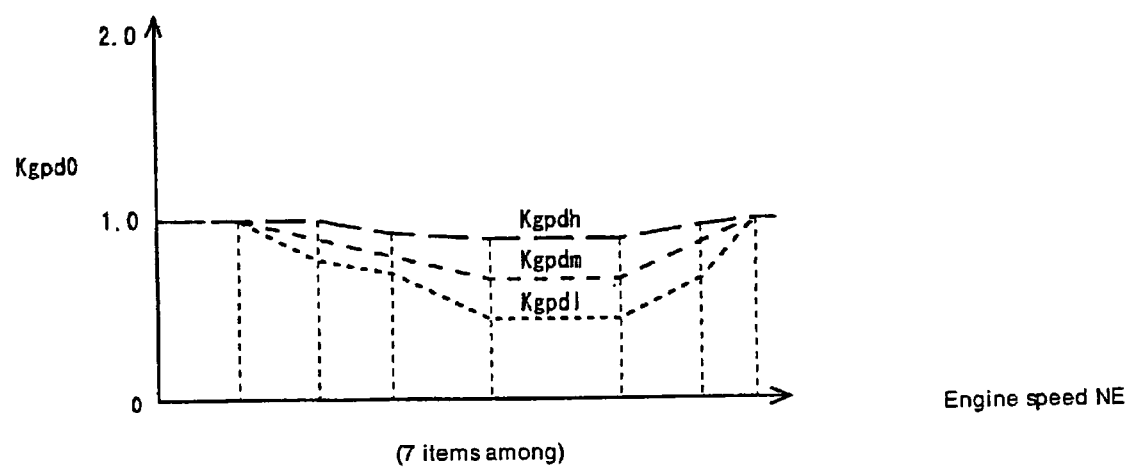
FIG. 6 is a view showing an example of the correction factor by a gear (Kgpd0)
Figure 7:
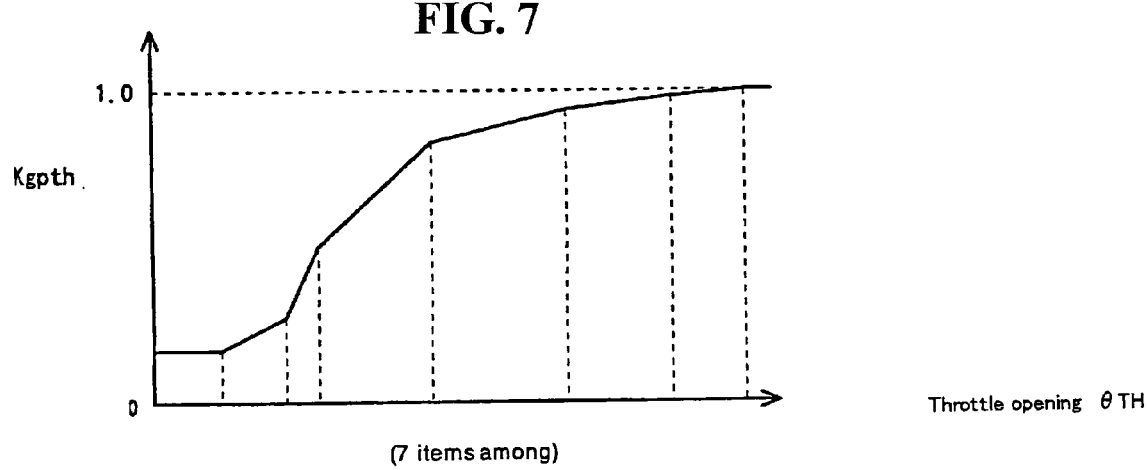
FIG. 7 is a view showing an example of a throttle correction factor (Kgpth).

FIG. 6 is a view showing the contents of each of the above-described tables schematically and superimposed. For each engine speed NE, there has been registered each correction factor Kgpdh, Kgpdm and Kgpdl corresponding thereto. In the present embodiment, each correction factor has been selected such that each correction factor at the engine speed NE indicates a tendency of Kgpdh (high load)>Kgpdm (middle load)>Kgpdl (low load). Specifically, in the present embodiment, the smaller the engine load becomes, the smaller the value of the correction factor becomes. As a result, the injection quantity of fuel is reduced. With regard to the relationship between the engine speed NE and each correction factor, registration is made with only 7 items among the engine speeds NE. Any other relationship can be determined through interpolation.

Referring again to FIG. 5, in the step S810, a θTH/Kgpth table is retrieved on the basis of the throttle opening θTH. The retrieval result will be registered as the throttle correction factor Kgpth. In the step S811, the correction factor by a gear Kgpd is calculated as a product of the provisional value Kgpd0 of the Kgpd and the throttle correction factor Kgpth.

In this respect, if the GP counter Ngp indicates "0" or the judgment in the steps S801 and S802 is negative, the correction factor by a gear Kgpd will be set to "1.0" irrespective of the data tables and the throttle correction factor Kgpth in the step S809.

Referring again to FIG. 3, in the step S10, the final fuel injection quantity Tout will be calculated by further adding a predetermined acceleration correction quantity Tacc and invalid injection time TiVB to a product of the basic injection quantity Ti, the total correction factor Ktotal, and the correction factor by gear Kgpd obtained by the Kgpd calculation unit 103.

In the step S14, a driving signal of the fuel injection valve 8 is outputted only during the fuel injection quantity Tout. The fuel injection valve 8 is opened only in a time period during which this driving signal is being outputted to inject the fuel.

According to the present invention, the following effects will be exhibited.

Since there is provided means for discriminating a gear position of the transmission in such a manner that the basic injection quantity is corrected on the basis of the discrimination result of the gear position, the optimum fuel injection quantity can be obtained in response to the engine load even if the engine speed NE and the throttle opening θTH are the same.

Since the correction factor is determined as a function of a gear position and this correction factor is multiplied by the fuel injection quantity in order to determine the optimum fuel injection quantity for each gear position, the optimum fuel injection quantity for each gear position can be obtained without providing a TH map for each gear position.

Since it has been arranged such that the lower the gear position becomes, the more the fuel injection amount reduced, it is possible to improve the specific fuel consumption during a low-speed traveling load.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control system for an internal combustion engine, the engine for transmitting a driving force to an output shaft through a transmission, comprising:
   means for detecting engine speed NE;
   means for detecting a throttle opening θTH;
   a TH map in which a fuel injection quantity has been registered with the engine speed NE and the throttle opening θTH as parameters, the TH map being used to determine a basic fuel injection quantity as a function of the engine speed NE and the throttle opening θTH;

means for discriminating a gear position of said transmission;

means for determining a fuel injection correction factor on the basis of the gear position and the engine speed NE; and means for correcting the basic fuel injection quantity determined by the TH map on the basis of a gear correction factor.

2. The fuel injection control system for an internal combustion engine according to claim 1, wherein the lower the gear position becomes, the more said correction means reduces the fuel injection quantity.

3. The fuel injection control system for an internal combustion engine according to claim 1, wherein said means for discriminating the gear position discriminates the gear position on the basis of said engine speed NE and a vehicle speed Vpls.

4. The fuel injection control system for an internal combustion engine according to claim 1, further comprising means for detecting manifold air pressure PB, wherein the manifold pressure PB is a factor used to determine the basic fuel injection quantity along with the engine speed NE and the throttle opening θTH used by the TH map.

5. The fuel injection control system for an internal combustion engine according to claim 1, wherein if a rate of change of the throttle opening ΔθTH exceeds a basic rate of change of the throttle opening ΔθTHref, the TH map is selected.

6. A fuel injection method for an internal combustion engine, the engine for transmitting a driving force to an output shaft through a transmission, said method comprising the steps of:

detecting engine speed NE;

detecting a throttle opening θTH;

providing a TH map in which a fuel injection quantity has been registered with the engine speed NE and the throttle opening θTH as parameters;

using the TH map to determine a basic fuel injection quantity as a function of the engine speed NE and the throttle opening θTH;

discriminating a gear position of said transmission;

determining a fuel injection correction factor on the basis of the gear position and the engine speed NE; and correcting the basic fuel injection quantity determined by the TH map on the basis of a gear correction factor.

7. The method according to claim 6, wherein the lower the gear position becomes, the more the fuel injection quantity is reduced.

8. The method according to claim 6, wherein said step of discriminating the gear position further comprises the step of discriminating the gear position on the basis of said engine speed NE and a vehicle speed Vpls.

9. The method according to claim 6, further comprising the steps of:

detecting manifold air pressure PB; and using the manifold pressure PB as a factor to determine the basic fuel injection quantity along with the engine speed NE and the throttle opening θTH used by the TH map.

10. The method according to claim 6, wherein if a rate of change of the throttle opening ΔθTH exceeds a basic rate of change of the throttle opening ΔθTHref, the TH map is selected.

* * * * *